April 5, 1960 D. M. GOODMAN 2,931,900
ELECTRICAL TESTING
Filed Jan. 31, 1955 4 Sheets-Sheet 4

INVENTOR.
BY DAVID M GOODMAN
ATT'Y.

United States Patent Office 2,931,900
Patented Apr. 5, 1960

2,931,900

ELECTRICAL TESTING

David M. Goodman, Wantagh, N.Y.

Application January 31, 1955, Serial No. 485,001

13 Claims. (Cl. 250—20)

This invention relates to the study of steady state and transient electrical parameters and phenomena. In particular it is directed to means, automatic and/or manual, for measuring the relationship of any two or more quantities in an electrical system, especially such as the incident and reflected voltages in transmission lines of any length including zero, Nyquist polar diagrams, gain-phase plots, loss-phase plots, etc.

It has been proposed heretofore to measure impedance, admittance, the reflection coefficient, or any transformation thereof, or standing wave ratio by devices which entail time consuming operations. For example, means heretofore proposed for plotting impedance information, on a steady state basis over a wide frequency range are complex in structure, cumbersome, costly to build, require large signal power, and involve a sacrifice of wide frequency coverage or accuracy, The instant invention overcomes disadvantages characteristic of prior proposals and in addition may be used in many investigations other than those already mentioned.

Among the primary purposes or objects of this invention is the reduction to an automatic process of the otherwise time consuming and tedious operations required to measure the impedance, admittance, reflection coefficient, or any transformation thereof, of a component or device or system or network over an extended frequency range or at a single frequency.

Another of the primary purposes or objects of this invention is to display for observation and/or recording the transient response of or within a component, device, system or network induced by an amplitude step function, a frequency step function, any combination thereof, or by an arbitrary but controlled signal stimulus.

Another object of this invention is to obtain the response of or within a component, device, network or system to a continuous wave.

Another object of this invention is to obtain the response from and in circuits, components, etc. capable of absorbing very little amounts of power.

Another object of this invention is to provide means to observe, analyze, and/or record the transient response of and within a circuit, network, device, or system in such fashion that both the amplitude and phase response, properly defined, are displayed individually and/or simultaneously.

An additional object of this invention is to display independently or simultaneously the amplitude and phase response, properly defined, to a frequency discontinuity or to any combination of amplitude and frequency variations, repetitive or otherwise, of or within any device, component, network or system.

A still further object of this invention is to achieve the aforesaid in a single instrument.

Another object of this invention is to provide means to plot the complex ratio between two or more signals, including means for controlling this ratio both on a steady state and transient basis.

Another object of this invention is to provide means to determine the frequency stability of signal generators, etc. by measuring the response of a calibrated impedance to a test signal or the response to said test signal of a plurality of calibrated impedances.

Still another object of this invention is to provide means to display the non-linear response of and within a circuit, network, component or device, to a controlled signal stimulus.

Still another object of this invention is to provide means to display the response of an active network, such as a vacuum tube voltmeter, to a controlled signal stimulus.

Another object of this invention is to perform the aforesaid general functions with a combination of mechanical parts and circuits which are simple to construct and maintain, which are relatively inexpensive, which preserve the accuracy of the system, and which by minor substitutions permits the frequency range and power range under investigation to be varied.

Further objects and advantages of this invention will become more apparent from the following description of the invention taken in connection with the accompanying drawing wherein.

Figure 1:
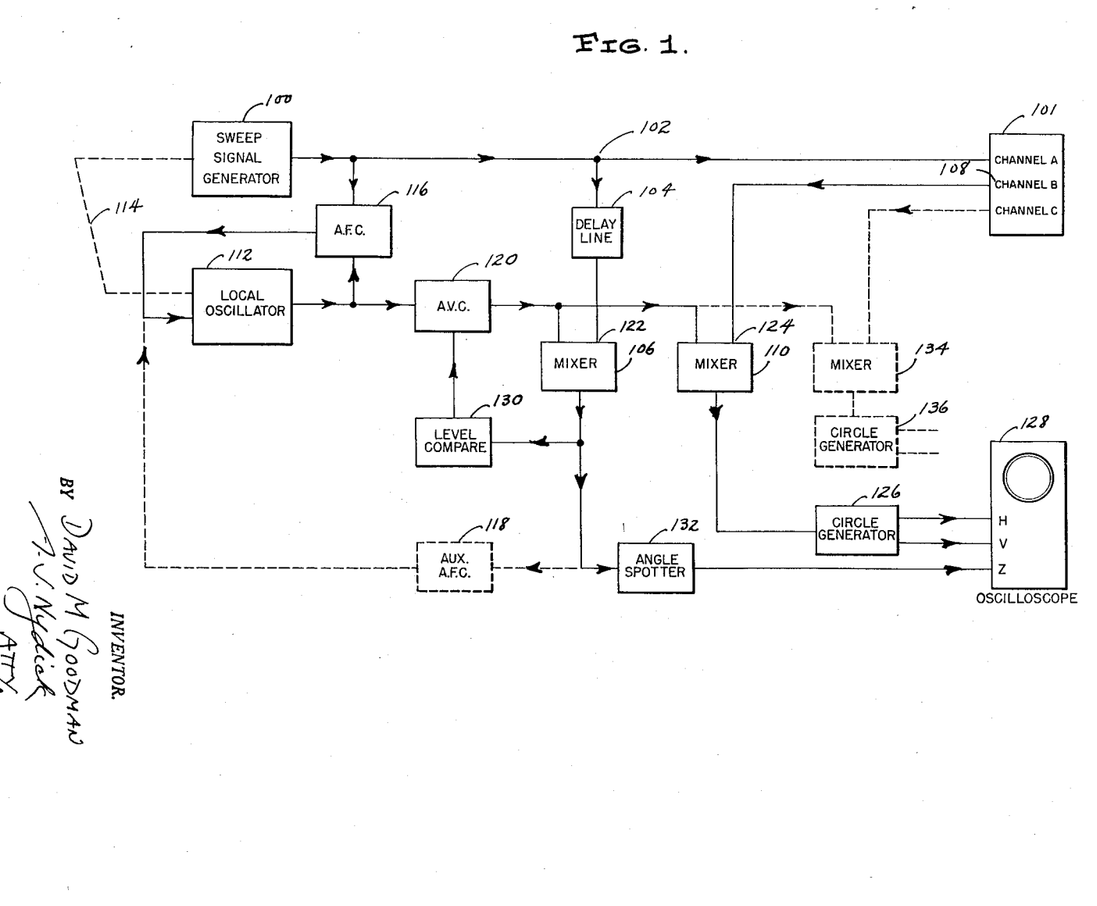
Fig. 1 is a block diagram showing a basic embodiment of this invention.

The block diagram of Fig. 1 shows a signal generator 100 feeding the line leading to a subject 101 under test or investigation. This signal generator is capable of being set in amplitude and frequency according to the requirements established by the problem, the solution of which will be a function of the test amplitude and frequency. The signal generator is also capable of being amplitude modulated and frequency modulated at a controlled rate. The following description of the invention and the operation thereof is on a steady basis where all variations are slow enough to be accurately followed by the various circuits and components.

The incident voltage (or line voltage, or quantities proportional to either or both, or to other parameters) is sampled at point 102 and transmitted through a delay means 104, to a mixer 106. Voltage is selected as being principally illustrative of the aforesaid quantities and, accordingly, the further description of this invention is set forth primarily in terms of voltage. Delay 104, which may be adjustable, causes the phase of the voltage at the mixer 106 to be properly related to the voltage which is sampled at point 108. This sampled quantity is transmitted to mixer 110.

In conjunction with signal generator, 100, is a local oscillator 112, which furnishes a signal maintained at a fixed frequency difference with respect to the signal generator. This may be accomplished or assisted by mechanical constraint indicated by phantom gearing, as at 114, or it may be accomplished or assisted by an automatic frequency control (AFC) loop operated through 116. It may be accomplished or assisted through a secondary AFC loop 118 but in any event, local oscillator 112, tracks the signal generator 100 with a fixed frequency difference. The output of local oscillator 112 feeds through an automatic volume control circuit 120, to be described below, to mixers 106 and 110, which in turn are operated as linear converters and translate the amplitude and phase information, fed in at points 122 and 124, to a different frequency which is exactly equal to the frequency difference referred to previously. This difference frequency generally is fixed. If it is adjustable it is selected for specific bands of frequencies within the range of signal generator 100. Each difference frequency is selected to reduce or eliminate harmonic problems, image problems, filtering problems, etc.

The output of mixers 106 and 110, although at the difference frequencies, contain the information, magnitude and phase, of the quantities previously sampled at 102 and 108. The output of mixer 110 feeds circle generator 126 which supplies two signals to the oscilloscope 128, the net result of which is to produce a circular sweep on the face of the oscilloscope tube. The radius of this circular sweep is controlled by the magnitude of the signal supplied from mixer 110. The frequency range over which the circle remains fixed in amplitude and circularity, for a corresponding fixed amplitude input to the circle generator, may be made rather broad, in turn thereby partially reducing the requirements on the tracking of the signal generator and local oscillator.

Simultaneously, the output of mixer 106, is held at a fixed amplitude by means 130, the level comparator, which varies the magnitude of the local oscillator injection voltage through automatic volume control means 120. Any change in the magnitude of the output of mixer 106 is immediately detected in 130, and through control means 120, the output of 106 is brought back to the proper level. Since both mixers, 106 and 110, are driven by the same injection voltage, and since both mixers operate linearly, the same scale change introduced in channel A is correspondingly affected in channel B. It is to be observed that the errors introduced by this multiplication process are completely controllable, calculable, and measurable, and are influenced by the amount of feedback in the AVC means 120, by the signal levels in the mixers, and by the properties of the mixers.

It now becomes clear that regardless of the amplitude variations in the signal generator output and/or of the local oscillator output, the output of mixer 106 is constant in amplitude. Since corresponding conversion gain changes have been made in both the channel A and channel B mixers the proportionality between the quantities sampled at 102 and 108 is preserved at the output of the two mixers. Hence the variations in the radius of the circular sweep presented at 128 are a direct function of the variations in channel B, and is displayed as it would be, were the channel A voltage constant. It is to be noted that it is advantageous to introduce the AVC 120 through the local oscillator so that it is possible to amplitude modulate the main signal to observe linearity or amplitude sensitivity of the item under test. If this latter facility is not desired, the AVC circuits may equally well operate upon the main line signal.

Scale changes are effected by adjusting the comparison level at 130 or by adjusting the channel gains. For example, if reflection coefficient measurements are to be made on a transmission line where the magnitude of this reflection coefficient varies between 0 and 1, the scales are adjusted so that complete reflection produces a circle of a given diameter on the tube face. As the line approaches termination, and the reflected voltage decreases, the circle diameter decreases reaching, in the limit, a spot at the center of the scope. When making measurements other than reflection coefficients and where there may be gain in the system, from point 102 to 108, it is obvious that other scales will be more desirable.

To present the phase information, angle spotter, 132, intensifies a particular portion of the circular trace produced above. Since the relative phase is required between the quantities sampled at 102 and 108, assuming sinusoidal steady state behavior, it is clear that the reflected wave, tracing a circle on the scope, may be used as the phase reference, where a particular point on the circumference corresponds to zero phase and which point is obviously adjustable and controllable. The point of intensification of the spot, however, is selected by taking the output of channel A from mixer 106, selecting a particular portion thereof to produce a sharp burst, as from a blocking oscillator which may be contained in 132, to z-axis modulate the scope for intensification purposes, or for blanking.

It is clear, at this point, that certain alternate embodiments may be utilized depending upon the end use of this invention. For example, the automatic frequency control loops illustrated in Fig. 1 may be replaced with automatic phase comparison systems when desirable. The difference frequency may be either higher or lower than the test frequency and may in fact be made equal to zero. Signals other than the main beat note may also be used for control or measurement purposes. The level comparator may keep the peak, the root-mean-square (R.M.S.), or the average of the controlled channel constant. As previously noted the AVC means may also operate on the test signal. The local oscillator signal, shown in Fig. 1 as coming from an independent source, may be derived from the main signal generator. For example, a portion of the output of the main signal generator 100 may be isolated to serve as the local oscillator signal, and then may be phase and/or amplitude modulated in a controlled fashion where the extent of the modulation may itself serve as part of the AVC and/or AFC means. The delay provided by means 104 may be introduced through the local oscillator lines. A third mixer 134, with its associated circle generator 136 may be used to plot additional information on another indicator (not shown) or indicator 128, by using a multigun tube or by time sharing the signals from circle generators 126, 136, etc. The "time-share" presentation is especially useful when the instant system is utilized in such form that the 90 degree phase shift used in circle generation is effectuated on the local oscillator signals and where the horizontal and vertical indicator deflection signals are presented as slowly varying direct current signals. It is also apparent that the reference signal, shown in Fig. 1 to emanate from point 102, may be arbitrarily chosen.

Figure 2:
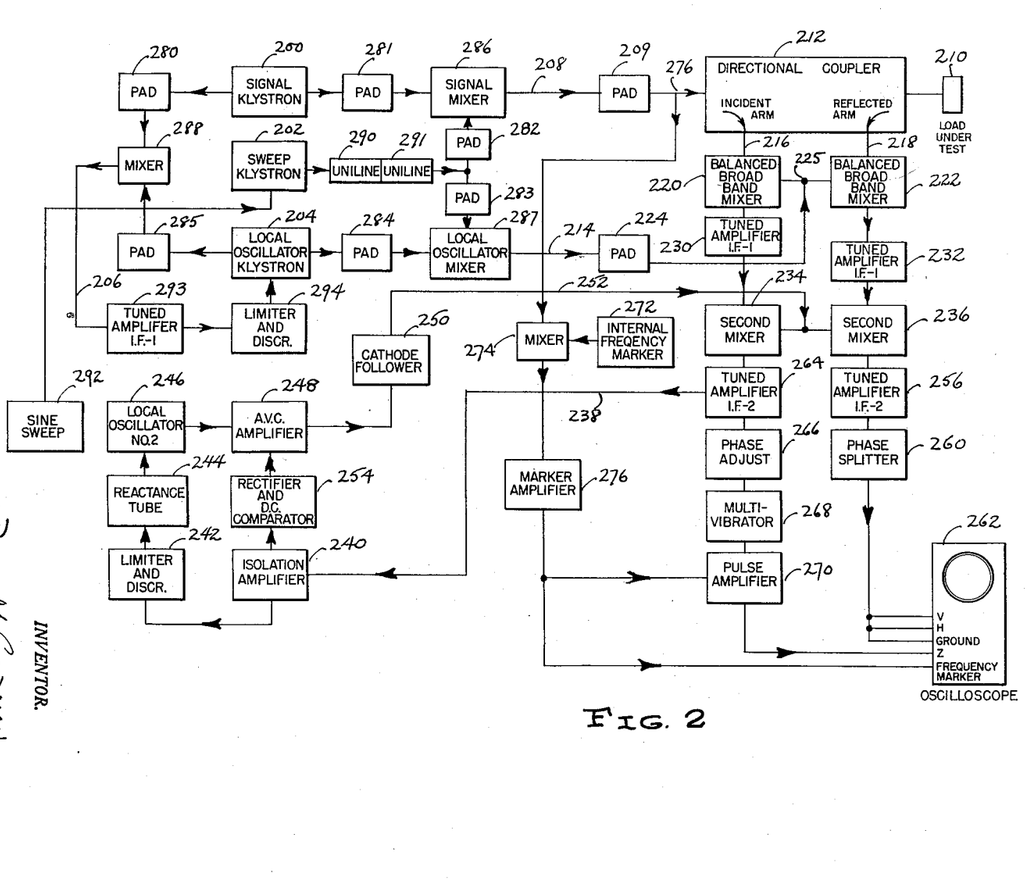
Fig. 2 is a block diagram of an embodiment of this invention as used to measure, by means of a Smith Chart display, the impedance or admittance of coaxial line elements over the frequency range 400–1600 megacycles.

Fig. 2 is a block diagram of an emboidment of this invention which accurately and rapidly plots the magnitude and phase of the reflection coefficient of coaxial line elements, terminations, networks, etc. By means of a Smith Chart overlay on a flat-face oscilloscope the data is immediately transcribed into an impedance or admittance plot. Provisions are made for wide band sweeps, or for single frequency plots, with intensifying and blanking controls to locate discrete frequencies. The frequency bands approximately 100 megacycles wide are swept at a rate of once per second. The sensitivity of the instrument allows measurements to be made on any element capable of dissipating fractions of a milliwatt on a steady state basis. The frequency range covered is 400–1600 megacycles.

The magnitude and phase of the reflection coefficient of an impedance determines the parameters of the impedance and is especially well adapted for transmission line circuit analysis. As normally defined, the reflection coefficient is a linear fractional transformation of the impedance on a transmission line. This information has taken practical form in the use of the "Smith Chart." By plotting the magnitude and phase of the reflection coefficient on a polar coordinate system it is possible to read from a Smith Chart overlay the series components of the unknown impedance. Due to the nature of the linear fractional transformation it is also possible to read the admittance of the test component by reversing the position of the reflection coefficient by rotation thereof through 180 degrees. The instant invention when used as an "impedance bridge" enables one to read the impedance, or admittance, information directly from the face of the indicator by means of a transparent Smith Chart overlay.

The organization of the system illustrated in Fig. 2 is as follows: Three X-band klystrons, 200, 202, 204, are tied together by means of an automatic frequency control circuit or loop 206 (comprising signal klystron 200, pad 280, mixer 288, local oscillator klystron 204, pad 285, tuned amplifier 293, and limiter and discriminator 294) to furnish two signals in the frequency range 400–1600 mc., the two signals at a particular frequency being separated from each other by approximately 21 mc. One of these signals, transmitted through line 208 and attenuator 209, feeds the unknown load 210 through a directional coupler 212. The other signal is transmitted through line 214 and is used for local oscillator purposes. The directional coupler 212 has two coupling elements, one of which picks off the incident voltage; the other picks off the reflected voltage. Resistance loaded loops are used for the coupler take-offs. The incident and reflected voltages, thus sampled, are transmitted through 50 ohm coaxial cables, 216, 218, to low level, high-conversion, balanced broad-band mixers, 220, 222, respectively. The local oscillator signal is injected into the broad-band mixers through amplitude and phase balanced tees and pads shown symbolically at 224 and 225, illustrated in greater detail in Figures 3, 4 and 7. The balanced broadband mixers are shown in greater detail in Figs. 5 and 6, and the triple klystron dual frequency source, in Fig. 3.

The output of each of the broad-band mixers (220, 222) passes through phase balanced low gain intermediate frequency (IF) amplifiers 230, 232, and are further reduced in frequency to 15 kc. in the mixers 234 and 236. The second automatic frequency control signal derived from the circuit or loop composed of line 238, isolation amplifier 240, limiter and discriminator 242, reactance tube 244, second local oscillator (designated as No. 2) 246, AVC amplifier 248, cathode follower 250 and line 252, and the automatic volume control signal derived from the circuit or loop composed of 238, 240, rectifier and D.C. comparator 254 and 248, 250 and 252, are introduced in the second mixers 234 and 236. The signals travelling through the mixer 220, the amplifier 230, the second mixer 234, tuned amplifier 264, etc. are proportional in amplitude and phase to the incident voltage of the directional coupler. The signals traveling through mixer 222, tuned amplifier 232, second mixer 236, tuned amplifier 256, etc. are proportional in amplitude and phase to the reflected voltage. After reduction to 15 kc., the reflected voltage is transmitted through filtering amplifier 256, to phase splitter 260, whence it emerges as two signals of about equal magnitudes, separated in phase by approximately 90 degrees. The signals are transmitted, as vertical and horizontal feeds, V and H respectively, to the oscilloscope 262 to produce a circular deflection invisible or visible on the screen. The incident voltage is transmitted through filtering amplifier 264, through phase adjuster 266, to synchronize a free running multi-vibrator 268 which is subsequently differentiated and amplified by pulse amplifier 270 for Z-axis modulation of the oscilloscope so that the reflected signal is made to appear at the proper phase point.

A self contained oscillator 272 (designated as internal frequency marker) generated signals from 400–1600 mc. and is included for pin-pointing specific test frequencies on the Smith Chart display. If further accuracy be desired in frequency location, an external source may replace generator 272. This marker frequency feeds one side of a crystal mixer 274. The other input to the mixer 274 is derived from the main transmission line 208 but decoupled approximately 35 db at point 276. When the signal frequency and marker frequency coincide within a frequency range of ±100 kc., the emergent difference frequency from mixer 274 is amplified in marker amplifier 276, and detected to furnish appropriate polarities for pulse amplifier 270 or oscilloscope 262 for subsequent intensification or blanking of the Smith Chart display.

The remaining elements of Fig. 2, to wit, pads 281, 282, 283, 284, mixers 286, 287, unidirectional transmission line elements 290, 291, and the frequency sweeper 292 will be described in connection with the description of Fig. 3, which illustrates the radio frequency plumbing for the triple klystron dual frequency signal source.

Figure 3:
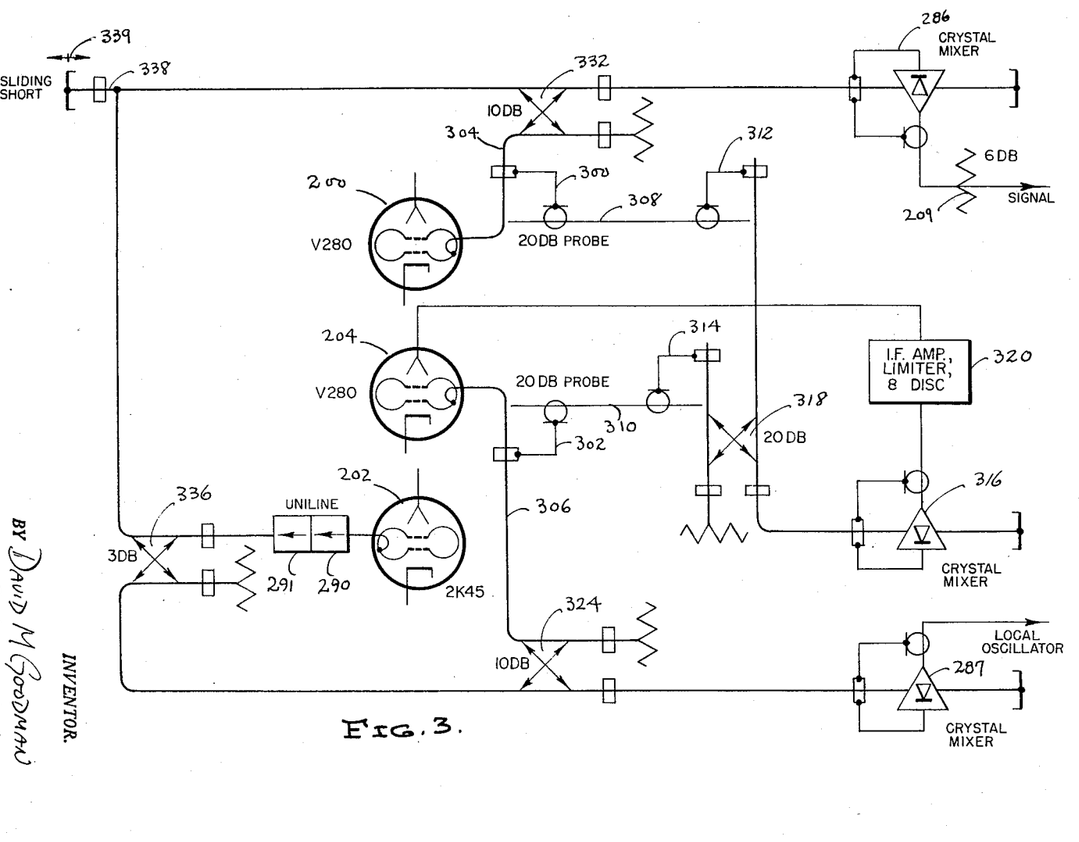
Fig. 3 illustrates high frequency connections used in producing a test signal and an auxiliary signal, which combination is illustrated in block form in Fig. 2.

In Fig. 3, two klystrons "Varian Type V280" designated as 200 and 204 in Figs. 2 and 3, operate at a fixed frequency of approximately 10.1 kmc. Two probes, each coaxial from waveguides 300 and 302, decoupled 20 db, are located in each of the V280 output waveguide sections 304, 306. The probes are connected to X-band coaxial cables 308, 310, which terminate in type N to waveguide adaptors 312 and 314. These two klystron outputs are mixed in a waveguide crystal mixer 316 through a 20 db directional coupler 318. The output of the crystal mixed 316 feeds a conventional broadband 21 mc. amplifier, limiter, and discriminator 320. The D.C. output of the discriminator is used to reflector modulate V280 klystron 204, so that the frequency difference between 200 and 204 is maintained almost constant at approximately 21 mc., the center frequency of the discriminator. The outputs of 200 and 204 feed into the termination of 10 db directional couplers 322 and 324 respectively, which couplers serve three purposes. Firstly, the waveguide crystal mixers 286 and 287 are isolated from the klystrons 200 and 204 respectively by the nominal 10 db coupling which results in improved frequency stability for 200 and 204 when 286 and 287 tend to feed back to the sources; secondly, the directional couplers 322, 324, serve as junctions for coupling 200 and 204 with the 2K45 klystron 202 in the signal waveguide mixers 286 and 287; thirdly, the directivity of the coupler enhances the isolation between the two klystrons 200 and 204 which must be sufficiently decoupled to eliminate the generation of spurious signals.

The 2K45 klystron 202 is isolated from its load by two unidirectional transmission line elements 290, 291 (unilines) connected in cascade so that isolation is achieved with little loss in transmitted power over an extended frequency range. The output then passes through a 3 db broadband directional coupler 336 for equal power division to the signal waveguide mixer 286 and to the local oscillator waveguide crystal mixer 287. Unilines 290 and 291 present a matched load to the 3 db coupler so that the directivity of the coupler may be utilized. To improve further the isolation between 200 and 204, an adjustable tee 338 is placed between the output of the 3 db coupler 336 and one of the 10 db directional couplers 322. The sliding short 339 on tee 338 is adjusted during operation to reject the 10.1 kmc. signal. The output of the signal waveguide crystal mixer 286 which feeds the directional coupler 212 (Fig. 2) is attenuated 6 db at 209 to improve the frequency stability of klystron 200 feeding that mixer. The 6 db coaxial pad 209 also reduces the variations of the incident voltage on the unknown load under test. The waveguide crystal mixer 287 which is used for local oscillator purposes requires less padding in that it feeds a coaxial tee 225 (Fig. 2) terminated on both sides with matched 20 db pads positioned ahead of mixers 220 and 222 (details shown in Fig. 4). The signal of 202 feeds both waveguide crystal mixers 286 and 287. Since the mixers are also individually fed by signals differing by 21 mc originating in 200 and 204, it is apparent that the difference frequency generated in the crystal mixers 286 and 287 will differ by 21 mc. Thus, when the operating frequency of 200 is 10.100 kmc., and when that of 204 is 10.121 kmc., and when 202 oscillates at 9.7 kmc., the two output frequencies are 400 and 421 mc. To cover the L-band frequency range of 400–1600 mc. the frequency of 202 is reduced from 9.7 to 8.5 kmc. Thus, when 202 oscillates at a frequency of 8.8 kmc. the outputs of the signal mixer 286 and the local oscillator mixer 287 are 1300 and 1321 mc. respectively.

The klystron 202 is thermally tuned. Accordingly, to change the frequency thereof the heat dissipated in the tuner section of the klystron is varied appropriately. This results in expansion or contraction of a bimetallic diaphram which controls the cavity spacing in the tube 202. The reflector voltage is chosen for the proper operating mode, which mode in turn is chosen as a compromise between the requirements for power output, frequency stability, and frequency swing. A calibration chart, supplied with the klystron chassis lists the tuner grid voltage setting and the reflector voltage setting for designated signal frequency outputs. To sweep the L-band frequency the X-band frequency of the 2K45 klystron 202 is varied. This is accomplished, either thermally as previously explained and/or by smoothly varying the reflector voltage. The magnitude of the frequency variation is controlled by the amount of reflector modulation and tuner grid power dissipation and is adjusted at the front panel of the klystron chassis. The extent of the frequency swing is limited by the decrease in power output of the klystron 202. Sine sweeper 292 (of Fig. 2) reflector modulates 202 to vary the frequency outputs over a range of 100 mc. at a rate of once per second.

The signal output of the waveguide crystal mixer 286 passes through the 6 db pad 209, and is transmitted past point 276 (see Fig. 2) where the signal is decoupled 35 db, as previously explained to furnish the marker signal. The signal then feeds into the directional coupler 212 which is terminated in the impedance 210. The directional coupler 212 has a low main-line voltage standing wave ratio (VSWR) so that it does not introduce errors into the measurements. The two side arms, incident and reflected, are sufficiently decoupled from the main-line so that the field set up by the impedance 210 in the directional coupler 212 is not disturbed. The orientation of the coupling loops in the directional coupler are so arranged that one output will be proportional to the incident voltage while the output of the other arm is proportional to the reflected voltage. The coupling elements themselves are terminated in 50 ohms with capacity tab compensation. The VSWR looking into the side arms is held to a low value so that the effects of multiple reflections and local oscillator injection, to be described later, will be controllable. The absolute coupling of the two arms need not be the same but the variation with frequency, e.g., 6 db per octave, is matched within a fraction of a db in both arms. Since the path length travelled by the reflected wave is greater than that travelled by the incident wave, it is necessary to lengthen the coaxial cable that carries the incident voltage from the directional coupler to the broad-band mixer 220. Normally the plane of reference is established at the end of the connector which terminates the directional coupler. More specifically, the plane of reference is that of a short connected to the output of the directional coupler 212. Other coaxial cables may be supplied to enable remote measurements to be made with the equipment. For example, when measurements are to be made at the end of a 10 foot cable, the cable to compensate for line length which is used in the incident channel will be approximately 20 feet long.

Figure 4:
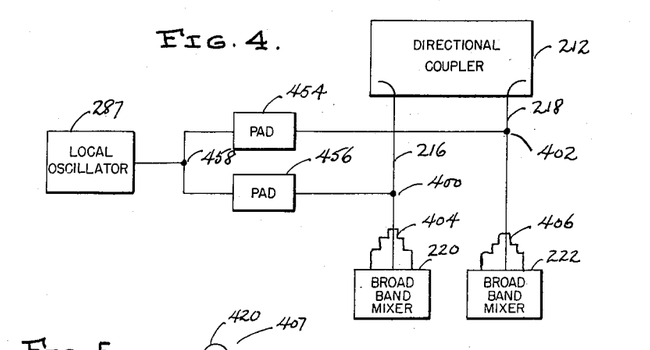
Fig. 4 shows means for injecting an auxiliary, or local oscillator, signal into the system illustrated in Fig. 2.

Fig. 4 illustrates the coupler connections and the means used for local oscillator injection. It is seen that two L-band signals are derived from the coupler 212, one proportional to the incident voltage, the other proportional to the reflected voltage, without disturbing the field pattern in the mainline. Each of the two signals is transmitted through a 50 ohm cable 216 and 218, through a coaxial tee 400 and 402 to a three step transition 404 and 406 terminated in the internal impedance of a grounded grid Western Electric Type 416A or Western Electric Type 416B triode contained in 220, 222. Simultaneously the local oscillator 287, feeds a tee 458, which in turn feeds pads 454 and 456 (shown grouped in Fig. 2 as isolating pad 224). The local oscillator signal that emerges from pad 454 passes via coaxial cable to tee 402 and thence to mixer 222. At the same time the local oscillator signal that emerges from pad 456 passes via coaxial cable to tee 400 and thence to mixer 220. The tee 458 is balanced. The pads 454 and 456, and the tees 400 and 402 are matched in both amplitude and phase behavior in the frequency range under consideration. Similarly the broad band mixers 220 and 222 (alike in construction) are matched.

Figure 5:
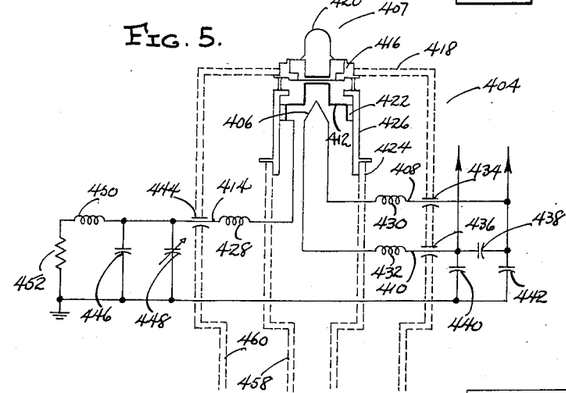
Fig. 5 illustrates the assembly of a type 416 vacuum tube line termination shown in Figs. 2 and 3.
Figure 6:
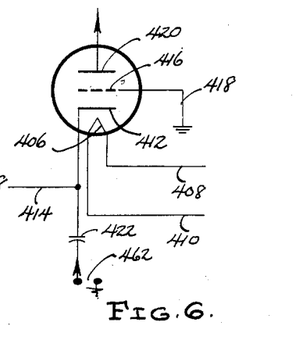
Fig. 6 illustrates a simplified electrical schematic as used in the assembly shown in Fig. 5

Fig. 5 diagrammatically shows the broad band mixer 220 in detail. The planar triode is shown at 407. Also shown is the large dimensioned end of the three step transition 404, the heater 406, the leadout therefrom 414, the control grid 416 shown grounded to the outer conductor 418, the plate cap 420, the high frequency coupling condensor 422, the inner conductor of the transmission line 424, the cathode shell 426, cathode choke 428, heater chokes 430 and 432, by pass capacitors 434, 436, 438, 440, 442 and 444, fixed tuning capacitor 446, and trimmer 448, choke 450, and the cathode bias resistor 452. The signals, both the incident voltage and the local oscillator voltage, enter mixer 220 via a coaxial cable and through the coaxial step transition 404; the signals appearing between inner conductor 458, the same as 424, and outer conductor 460, are impressed between grid and cathode of the triode through coupling capacitor 422. This is illustrated in Fig. 6 where the incoming signals, represented as being at point 462, are transmitted through the coupling capacitor 422 to the cathode of the triode; the grid 416 is shown grounded as at point of the triode; the output signal emerges from plate 420; the 416A or 416B is a planar triode with a resonant frequency in the order of 4000 mc. and due to its coaxial structure is ideally suited for the purpose herein described. The triode is operated as a mixer with the oscillator signal being derived from the triple klystron source previously described. The signal levels of both the local oscillator and the incident voltage are of a low order of magnitude to make the conversion through the 416 triode a linear process, both amplitude and phasewise. The operational properties of the two mixers 220 and 222 are established so that the functional behavior of the two mixers is identical over the frequency range 400–1600 mc. The output of the mixer in the incident channel is a 21 mc. signal, the amplitude and phase of which are related to the incident voltage on the transmission line but now at a frequency of 21 mc. The 21 mc. signal out of mixer 222 derived the reflected channel contains similar information with respect to the voltage reflected from the termination on the main transmission line. The two 21 mc. signals produced by mixers 220 and 222 take the courses shown in Fig. 2. The signal produced in 220 passes through a 21 mc. tuned amplifier 230, the purpose of which is to eliminate spurious signals; and to adjust the level for proper operation of the second mixer 234. The signal produced in 222 passes through a similar amplifier 232 into mixer 236. The two amplifiers 230, 232, are balanced with regard to phase over a band of frequencies sufficiently broad to insure proper operation if the 21 mc. difference frequency established in the discriminator of the klystron chassis varies from its set value. The incident channel and reflected channel second mixers, 234 and 236, are fed at their respective grids with the two 21 mc. signals. At the same time a signal is injected that originates in local oscillator 246, operating at a frequency 15 kc. removed from 21 mc. The low noise figure triode mixers, 234, 236, are capable of handling a large dynamic range. The dynamic range requirements are necessitated by the variations in the incident voltage in the main transmission line and by the virtue of the 40 db variations to be measured in the reflected channel signal. The two mixers also simultaneously perform in part the important function of the automatic volume control. The signal levels of both mixers are sufficiently low so that the conversion process again is a linear. This linear property assures an identical scale factor change in the reflected channel for a controlled scale factor change in the incident channel. The outputs of the second mixers 234 and 236 pass through tuned amplifiers 264 and 256 respectively, both amplitude and phase balanced, and the signals emerge at 15 kc. Hence, by maintaining the voltage at the output of 264 at a constant value, the proper scale is maintained for the reflected voltage on the Smith Chart display.

The output of mixer 236 passes through tuned amplifier 256; both to eliminate spurious signals and to set the signal level and thence is transmitted to phase splitter 260. One of the outputs of 260 drives the vertical deflection system in the indicator unit 262 while the other signal, shifted in phase by 90 degrees, drives the horizontal deflection circuits in the indicator unit 262. The result is a circular deflection pattern revolving at a 15 kc. rate on the face of the oscilloscope. The radius of this circuit is adjustably controllable by means of a single control by varying the channel gain ahead of the phase splitter 260. This radius is normally adjusted to coincide with the outside circle of the Smith Chart for a short of open circuit termination on the L-band directional coupler 212. To magnify the presentation of the reflection coefficient the gain in the reflected channel may be increased, or due to the automatic volume control features, the gain in the incident channel may be decreased. In this embodiment provisions are made for increasing this gain by a factor of two by means of a front panel designated "normal-expand." The 90 degree phase shift circuit is relatively broad-band so that drifts in the frequency of the 15 kc. signal will not introduce excessive error.

It is to be noted that the voltage emerging from 264 is isolated to perform many functions. The incident voltage, now at 15 kc., is amplified and filtered in 264, and through a cathode follower contained in 266, feeds a phasing circuit also in 266 which is controllable in two respects. The phase may be shifted by 180 degrees, which controls the choice of impedance or admittance display, or the phase may be varied continuously over approximately 50 degrees to adjust the phase of the spot that eventually appears on the Smith Chart display. Normally this control is set for zero phase when in the impedance position and with a short circuit for termination. Then the 15 kc. signal, after phase alteration in 266 synchronizes a 15 kc. multivibrator 268 whose output is differentiated. The resultant spike, approximately one-half microsecond in duration, is amplified in 270 and transmitted for Z-axis modulation of the indicator unit, 262. Simultaneously, the 15 kc. voltage emerging from 264 is transmitted by 238 isolation amplifier 240, thence to 242 wherein the signal is further amplified, limited, and drives a 15 kc. discriminator. The output of 242 controls reactance tube modulator 244. The modulator in turn varies the frequency of the second local oscillator 246 (set for approximately 21 mc.). The output of 248 feeds cathode follower 250, whence it is transmitted via 252 to second mixers 234 and 236. The loop gain of the second automatic frequency control circuit, comprising 234, 264, 238, 240, 242, 244, 246, 248, 250, and 252 is approximately 40 db. The effective band width in this loop is approximately 5 kc. A network between 242 and reactance tube modulator 244 stabilizes this feedback loop. Also simultaneously the voltage emerging from 264 and in conjunction with feedback loop 238, 240, 254, 248, 250, 252, and 234 and 236 controls the overall gain of the system. This is accomplished by amplification in 240, the output of which feeds a biased detector in 154. When the voltage output of 240 exceeds a predetermined level, set in 254, a signal is obtained in 254 which ultimately reduces said voltage output. The output of 254 controls the gain of AVC amplifier 248. Hence as the signal emerging from 264 exceeds a predetermined level, the output of 248 is reduced to maintain the signal emerging from 264 at a constant level. In this embodiment the gain of this last described loop is approximately 40 db. Deviation of the magnitude of the signal emerging from 264 from the set value is inversely proportional to the AVC loop gain. Simultaneously any deviation in the signal emerging from 236 from its proper value is inversely proportional to the AVC loop gain. The effective bandwidth in this last mentioned feedback loop is also approximately 5 kc. The stabilizing networks are located between the biased detector in 254 and an amplifier also in 254. The output of AVC amplifier 248 feeds a cathode follower 250 which is matched to 90 ohm cable 252.

The vertical and horizontal signals from 260 are transmitted at a voltage level of approximately 1 volt to reduce the effects of stray pick-up. The indicator 262 is a modified Du Mont Type 304A oscilloscope. The Y-axis amplifier in 262 has the low level stages removed to reduce the drift and in its place a single stage phase inverter is inserted. The overall display is relatively accurate. The Du Mont Type 5–ADP is a flat-face electrostatic focus and deflection cathode-ray tube with very high sensitivity deflection plates. The high sensitivity is achieved by using long deflection plates, limiting the scan to a useful portion of the full screen diameter. The flat surface of the tube face greatly improves the optical quality of the 5–ADP over that of other 5-inch tubes. In addition, tolerances are very closely controlled; angle alignment between the deflection plates held to within 1 degree, while deflection factors are held to within 10 percent with pattern distortion less than 2 percent over a considerable area. The spot size and optical resolution is in the order of ½ percent of full-scale. With an expanded presentation the center of the Smith Chart can be magnified so that the resolution may be increased.

The oscilloscope has been modified to allow for the mounting of either a complete Smith Chart or an expanded Smith Chart. Either of the Smith Chart overlays is mounted adjacent to the flat-face of the cathode-ray tube to reduce parallax errors. The Smith Chart may be rotated so that small line length corrections may be inserted.

On a single frequency sinusoidal steady state basis the operation of the instant invention is clear. A spot, bright or dark, will appear on the face of a CRT, or other indicator, which spot will be a plot of the reflection coefficient vector. As the frequency of the test signal varies, and assuming a change in the magnitude and/or phase of the load impedance with frequency, the spot will move across the face of the CRT plotting the loci of the continuously varying reflection coefficient as a function of frequency. The maximum allowable speed at which this test frequency may vary depends upon the various components and circuits and mostly upon the bandwidths associated with the various circuits. The maximum allowable sweep frequency may be determined experimentally by applying a resistive load, or a short or open circuit, in the reference plane and by increasing the sweep speed until the spot position indicates an error in excess of that allowed on a steady state basis. Below this maximum sweep rate conditions the instrument will accurately record the "transient response" of any termination which is swept at a lesser rate and whose intrinsic variations with frequency do not exceed the bandwith limitations of the reflected channel. Fortunately, these restrictions can be calculated and plotted so that the instrument may be adapted for transient analysis. In this regard it should be mentioned that the state of the art has not progressed to the point where the results may be immediately interpreted in defined terms, but if we choose to speak of a "transient impedance" then the microwave impedance bridge will present the locus of same. The extension here, of the results obtained on a steady-state basis, is to a sweep frequency transient. It is clear that the principles discussed apply to a continuous wave pulse train transient, to an amplitude modulated wave or pulse train, or to any combination thereof including combination with aforesaid frequency variations. With further regard to this interpretation of the transient behavior it may be more desirable to discard the concept of phase and measure only the amplitude response continuously as a function of time. This may be especially valuable for application involving four terminal networks, or others, where the interest is not so much in transient response but in non-linearities, distortions, etc. In these latter cases the reflected signal, or more generally the channel B signal, is plotted on a time scale by various means available to the experimenter, or any signal related in a known fashion to the channel B signal is so plotted.

The linear conversion process referred to previously may be set forth in mathematical terms as follows:

| Sampled Quantity | Converted Quantity |
| --- | --- |
| $V_i \cos \omega_1 t$ | $k_1 V_i \cos (\omega_2 t + \theta)$ |
| $V_r \cos (\omega_1 t + \theta_r)$ | $k_2 V_r \cos (\omega_2 t + \theta + \theta_r)$ |

It will be observed that the ratio of the magnitudes of $V_i$ and $V_r$ remain unchanged except for scale factor and that the phase difference $\theta_r$ between the two sampled quantities remains the same after conversion to the second frequency $\omega_2$. Any device or devices capable of multiplying each of two signals by a third signal, while at the same time preserving the desired relationship set forth above, may be used in place of the mixers referred to above.

Figure 7:
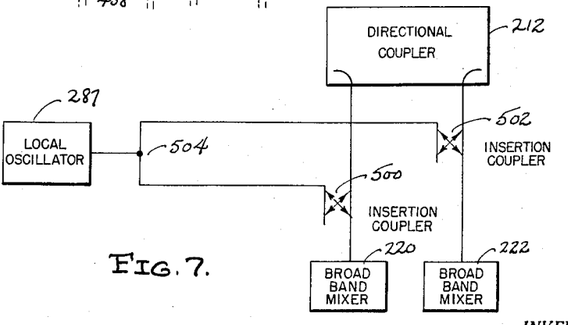
Fig. 7 illustrates alternate means for local oscillator injection into the broad-band mixers shown in Figs. 2, 4, 5 and 6.

An alternative to the means illustrated in Fig. 4 for local oscillator injection is shown in Fig. 7. The signal supplied by 287 feeds symmetrical tee 504 which in turn feeds two directional couplers 500 and 502. Coupler 500 combines the signal from the incident arm of the coupler 212 with the signal from 287, both of which are fed to mixer 220. Coupler 502 combines the signal from the reflected arm of the coupler 212 with the signal from 287, both of which are fed to the mixer 222. The two couplers 500 and 502 have similar characteristics. When the broadband mixers 220 and 222 represent a matched load to input signals, the isolation between channels becomes a function of the coupling factor and directivity of the couplers 500 and 502. The resultant combination minimizes the signal losses while maximizing the isolation between mixers 220 and 222.

In connection with this last mentioned alternative, it is noted by referring to Figs. 5 and 6 that the broadband mixers 220 and 222 operate untuned. Depending upon the center frequency and the frequency range to be covered it may be desirable to tune the input capacity of the mixers used. This results in improved effective signal strengths. With the injection means shown in Fig. 7, this tuning also improves the isolation between channels. In Fig. 5 chokes 428 and 450 and tuning capacitors 444, 446, and 448 operate to reduce the cathode impedance of the mixers 220, 222 to the output signal of said mixers. The tuning of choke 428 for the purposes aforesaid will also produce a similar result. It is also to be noted that chokes 428, 430, and 432 may be placed within the inner conductor of the transmission line step transition. The transition need not be three step, need not be abrupt transition, and may be constructed for different line impedances. These variations depend upon the frequency range under consideration. In fact, at the lower frequencies the coaxial construction may be replaced by conventional line connections and wiring and the directional couplers themselves may be replaced by Wheatstone bridge circuits. At the lower frequencies each of the mixers may operate push-pull with attendant improvement in performance and rejection of local oscillator signal.

The triple klystron dual frequency source shown in Fig. 3 may be replaced not only in this embodiment but also in other utilizations depending upon frequency ranges, power considerations, etc., as hereinabove and hereinafter mentioned.

With regard to Fig. 3, the waveguide sections illustrated may be replaced with microstrip components to conserve space and reduce cost. The crystal mixers may be operated with parallel or ring construction to increase the power output. The sliding short shown at 339 may be replaced by other filtering means to increase the isolation between mixers 286 and 287. In fact complete isolation may be effected by using a dual frequency source obtained directly from voltage tunable oscillators such as travelling wave tubes.

In both Figs. 1 and 2 circle generators are illustrated. These generators may be of the phase splitter type or 90 phase shift delay generators. In either case the resultant polar coordinate display is especially well suited for Smith Chart operation or for Nyquist displays. In other cases, such as in transient study or for a nonlinear termination, or even for steady state measurements, an amplitude time indicator or an orthogonal magnitude-phase plot may be more desirable in the way of display. An amplitude time response is available at the output of the reflected channel at any point before the circle generator. A magnitude-phase plot may be presented from this same point in conjunction with a continuous phase angle reader. A still further means for display may be provided when the magnitude of the in-phase and out of phase components of the response is desired in preference or in addition to that information already available. In such case, the local oscillator signal is coherent (even when modulated) with the test signal while one mixer is fed by the local oscillation signal and the other mixer is fed by the local oscillator signal shifted by 90 degrees. A broadband directional coupler yields this phase shift over a wide frequency range. Expressed in mathematical terms this operation may be represented by

| Sampled Quantity | Converted Quantity |
| --- | --- |
| $V_r \cos (\omega_1 t + \theta)$ | $k_1 V_r \cos \omega_1 t [\cos (\omega_1 t + \theta)]$ <br> $k_2 V_r \cos (\omega_1 t + 90°)[\cos (\omega_1 t + \theta)]$ | with the resultant output after low pass filtering of $$a_1 V_r \cos \theta \text{ and } a_2 V_r \sin \theta$$

where $a_1$ and $a_2$ are scale factors. In the case of a modulated local oscillator signal the outputs are in terms of the modulation applied and such output modulation terms are included in the constants $a_1$ and $a_2$. The modulation terms of the local oscillator signals are contained in the factors $k_1$ and $k_2$. The operations required to relate $V_r$ to $V_i$ have been discussed previously.

It will be understood that the foregoing description of the invention and the embodiments and alternatives set forth are merely illustrative of the principles thereof. Accordingly, the appended claims are to be construed as defining the invention within the full spirit and scope thereof.

I claim:

1. Means to produce two test signals related to each other comprising a first signal source capable of operating at a frequency $f_1$ and a second signal source capable of operating at a frequency $f_2$, a uni-directional transmission device on the output side of said second signal source followed by a first directional coupler with two outputs, one output of said coupler furnishing a first input signal with a frequency $f_2$ to a second directional coupler, the other output of said first directional coupler furnishing a first input signal with a frequency $f_2$ to a third directional coupler, means for connecting said first signal source to provide a second input to said second directional coupler, means for connecting a third signal source capable of operating at a frequency $f_3$ to provide a second input to said third directional coupler, means for mixing the output of said second directional coupler to provide a first test signal, means for mixing the output of said third directional coupler to provide a second test signal, means for automatically controlling the frequency difference between said first signal source and said third signal source, and means for modulating said second signal source.

2. A device in accordance with claim 1 including electrical filtering means in one of the output lines of said first directional coupler to decouple said first signal source from said third signal source.

3. A device in accordance with claim 1 wherein the means for automatically controlling the frequency difference between said first signal source and said third signal source comprises coupling means to said first signal source and coupling means to said third signal source, both said coupling means being capable of providing inputs to a fourth directional coupler capable of delivering an output which can drive a third mixer that generates a signal used for controlling said frequency difference.

4. A device in accordance with claim 1 wherein the means for modulating said second signal source comprises means for varying a voltage, thereby to alter the frequency of said second signal to provide the two test signals with variable frequency outputs.

5. A device in accordance with claim 1 wherein the means for modulating said second signal source comprises means for varying a voltage, thereby to alter the amplitude of the output of said second signal source.

6. In combination: two parallel transmission paths, a first mixer for receiving a first signal input and yielding a second signal output in one of said paths, at least one other mixer for receiving a third signal input and yielding a fourth signal output in the other of said paths, an oscillator coupled to inject a fifth signal into both said mixers, and amplitude control means responsive to the signal output of one of said mixers for controlling the amplitude of the fifth signal injected into both said mixers.

7. The combination of claim 6 including automatic frequency control means responsive to a signal in one of the transmission paths for controlling the frequency of said fifth signal.

8. The combination of claim 6 wherein said amplitude control means comprises means for comparing said signal output of one of said mixers with a reference signal.

9. The combination of claim 6 wherein said amplitude control means comprises a cascade arrangement of a tuned amplifier, rectifier and direct current comparator for controlling the amplitude of said fifth signal.

10. The combination of claim 6 wherein said amplitude control means comprises a tuned amplifier, means responsive to an output of said tuned amplifier for controlling the amplitude of said fifth signal, and a second means responsive to an output of said tuned amplifier for controlling the frequency of said fifth signal.

11. In combination: two parallel transmission paths, a first mixer for receiving a first signal input and yielding a second signal output in one of said paths, at least one other mixer for receiving a third signal input and yielding a fourth signal output in the other of said paths, an oscillator coupled to inject a fifth signal into both said mixers, and amplitude control means responsive to the signal output of one of said mixers for controlling the amplitude of the fifth signal injected into both said mixers, whereby said signal output of one of said mixers is maintained substantially constant in amplitude.

12. The combination of claim 11 including automatic frequency control means responsive to a signal in one of the transmission paths for controlling the frequency of said fifth signal.

13. The combination of claim 11 wherein said amplitude control means comprises a tuned amplifier, and means responsive to an output of said tuned amplifier for controlling the amplitude of said fifth signal, and a second means responsive to an output of said tuned amplifier for controlling the frequency of said fifth signal.

References Cited in the file of this patent

UNITED STATES PATENTS

| Re. 22,587 | Varian et al. | Jan. 2, 1945 |
| 2,294,100 | Travis | Aug. 25, 1942 |
| 2,410,817 | Ginzton et al. | Nov. 12, 1946 |
| 2,436,830 | Sharpless | Mar. 2, 1948 |
| 2,505,251 | Knol et al. | Apr. 25, 1950 |
| 2,568,090 | Riblet | Sept. 18, 1951 |
| 2,569,129 | Kamm | Sept. 25, 1951 |
| 2,570,715 | Robinson | Oct. 9, 1951 |
| 2,572,235 | Young | Oct. 23, 1951 |
| 2,605,400 | McClain | July 29, 1952 |
| 2,649,570 | Radcliffe | Aug. 18, 1953 |
| 2,654,863 | Riblet | Oct. 6, 1953 |
| 2,713,122 | Henley | July 12, 1955 |
| 2,765,460 | Marion | Oct. 2, 1956 |
| 2,788,445 | Murray et al. | Apr. 9, 1957 |
| 2,817,813 | Rowen et al. | Dec. 24, 1957 |

OTHER REFERENCES

"Directive Couplers in Wave Guides," by Surdin in Journal of the Institute of Electrical Engineers, No. 4, dated 1946, pages 725–736.